United States Patent
Yamamoto (10) Patent No.: US 9,966,862 B2
(45) Date of Patent: May 8, 2018

(54) POWER SUPPLY SYSTEM WITH PHOTOCOUPLER DRIVE CIRCUIT

(71) Applicant: Onkyo & Pioneer Technology Corporation, Osaka (JP)

(72) Inventor: Kazuki Yamamoto, Osaka (JP)

(73) Assignee: Onkyo & Pioneer Technology Corporation, Osaka (JP)

( * ) Notice: Subject to any disclaimer, the term of this patent is extended or adjusted under 35 U.S.C. 154(b) by 0 days. days.

(21) Appl. No.: 15/090,407

(22) Filed: Apr. 4, 2016

(65) Prior Publication Data
US 2016/0301318 A1    Oct. 13, 2016

(30) Foreign Application Priority Data

Apr. 10, 2015 (JP) .................................. 2015-080584

(51) Int. Cl.
*H02M 3/335* (2006.01)
*G06F 1/32* (2006.01)
(Continued)

(52) U.S. Cl.
CPC ........ *H02M 3/33523* (2013.01); *G03G 15/80* (2013.01); *G06F 1/32* (2013.01);
(Continued)

(58) Field of Classification Search
CPC ............ H02J 9/005; G06F 1/32; G03G 15/80; H02H 3/20; H02M 3/33523; H02M 1/32;
(Continued)

(56) References Cited

U.S. PATENT DOCUMENTS

| 5,689,407 A | * | 11/1997 | Marinus | ............ | H02M 3/33523 363/21.12 |
| 5,812,383 A | * | 9/1998 | Majid | ............... | H02M 3/33523 363/19 |
| 5,852,550 A | * | 12/1998 | Majid | ............... | H02M 3/33523 363/19 |
| 5,905,491 A | | 5/1999 | Kim | | |

(Continued)

FOREIGN PATENT DOCUMENTS

EP    0 875 983 A2    11/1998
JP    2004-056981 A    2/2004
(Continued)

OTHER PUBLICATIONS

Extended European Search Report dated Sep. 1, 2016 for corresponding European Application No. 16163615.4.

*Primary Examiner* — Gustavo Rosario Benitez
(74) *Attorney, Agent, or Firm* — Renner Otto Boisselle & Sklar, LLP (57) ABSTRACT

A switching power supply includes a first switching element connected between a primary winding of a transformer for the switching power supply and the ground, a shunt regulator serving as an output voltage detection circuit configured to detect an output voltage on a secondary winding side of the transformer, a photocoupler configured to transmit the output voltage to a control circuit, a second switching element configured to receive a stop signal for stopping operation of the switching power supply, and a photocoupler drive circuit configured such that when the second switching element has received the stop signal, power output from a low-frequency transformer power supply or the switching power supply is supplied to the photocoupler, and the stop signal is transmitted to the control circuit via the photocoupler.

4 Claims, 5 Drawing Sheets (51) Int. Cl.
*H02M 3/26* (2006.01)
*H02M 3/28* (2006.01)
*H02J 9/00* (2006.01)
*G03G 15/00* (2006.01)
*H02M 1/00* (2006.01)

(52) U.S. Cl.
CPC ............... H02J 9/005 (2013.01); H02M 3/26 (2013.01); H02M 3/285 (2013.01); H02M 3/33538 (2013.01); *G03G 15/5004* (2013.01); *H02M 2001/0032* (2013.01); *Y02B 70/16* (2013.01)

(58) Field of Classification Search
CPC .. H02M 1/36; H02M 1/08; H02M 2001/0032; H02M 2001/0025; H02M 2001/0009; H02M 3/335; H02M 3/33553; H02M 3/33507; H02M 3/28; H02M 3/22; H02M 3/33538; H02M 3/26; H02M 3/285
See application file for complete search history.

(56) References Cited

U.S. PATENT DOCUMENTS

| | | | |
|---|---|---|---|
| 6,104,622 | A | 8/2000 | Shin |
| 6,195,271 | B1 | 2/2001 | Suzuki et al. |
| 6,430,062 | B1 | 8/2002 | Shin |
| 6,434,024 | B2* | 8/2002 | Shirato ............... H02M 7/217 363/21.07 |
| 2002/0008979 | A1* | 1/2002 | Nagai ............... H02M 3/33523 363/95 |
| 2004/0208024 | A1* | 10/2004 | Nagano ............ H02M 3/33523 363/19 |
| 2012/0249005 | A1* | 10/2012 | Jin .................... H05B 33/0818 315/206 |
| 2013/0016535 | A1* | 1/2013 | Berghegger ...... H02M 3/33507 363/21.15 |

FOREIGN PATENT DOCUMENTS

| | | |
|---|---|---|
| JP | 4682438 B | 5/2011 |
| JP | 2013-198184 A | 9/2013 |

* cited by examiner

POWER SUPPLY SYSTEM WITH PHOTOCOUPLER DRIVE CIRCUIT

BACKGROUND OF THE INVENTION

1. Field of the Invention

The present invention relates to a power supply system, and particularly relates to a power supply system using a photocoupler for signal transmission.

2. Description of the Related Art

In a switching power supply configured such that a power input side and a power output side are electrically insulated from each other, an electrically-insulated signal transmission unit such as a photocoupler is used when an output voltage value is fed back to the power input side.

Japanese Patent No. 4682438 describes a switching power supply device. In order to stabilize output voltage, a voltage detection signal of an output voltage detection circuit is transmitted to a control circuit by a photocoupler, and is fed back to control of the pulse width of a drive signal of a MOSFET serving as a switching element in the control circuit. Moreover, when excess output voltage is caused, an overvoltage detection signal of an overvoltage detection circuit is transmitted to the control circuit by another photocoupler to stop operation of the MOSFET.

In some cases other than overvoltage detection as described in Japanese Patent No. 4682438, ON/OFF of a switching power supply may be performed. In order to transmit a command signal for ON/OFF of the switching power supply to a control circuit on a power input side, an electrically-insulated signal transmission unit such as a photocoupler is used, as was expected. In this case, two photocouplers are required, which include a photocoupler for output voltage value feedback and a photocoupler for signal transmission for ON/OFF of the switching power supply.

SUMMARY OF THE INVENTION

The present invention is intended to provide a power supply system capable of using a single photocoupler for two types of signal transmission.

A power supply system of the present invention is a power supply system including a low-frequency transformer power supply and a switching power supply. The switching power supply includes a first switching element connected between a primary winding of a transformer for the switching power supply and the ground, a rectification smoothing circuit connected to a secondary winding side of the transformer for the switching power supply, an output voltage detection circuit configured to detect the output voltage value of the rectification smoothing circuit, a photocoupler configured to transmit the output voltage value to a control circuit, a second switching element configured to receive a stop signal for stopping operation of the switching power supply, and a photocoupler drive circuit configured such that when the second switching element has received the stop signal, power output from an operating one of the low-frequency transformer power supply or the switching power supply is supplied to the photocoupler, and the stop signal for the switching power supply is transmitted to the control circuit via the photocoupler.

In the power supply system of the present invention, the photocoupler preferably includes a light-emitting element provided on an output voltage detection circuit side, and a photosensitive element provided on a control circuit side. The photocoupler drive circuit preferably includes a power supply switching element of which emitter terminal is connected to output terminals of the low-frequency transformer power supply and the switching power supply, of which collector terminal is connected to an anode of the light-emitting element via a drive resistor element, and of which base terminal is connected to an output terminal of the second switching element, and a ground switching element configured to ground a cathode of the light-emitting element when the stop signal has been received.

In the power supply system of the present invention, the drive resistor element is preferably set at such a resistance value that a current equal to or higher than the drive current threshold Idth of the light-emitting element can be supplied, the drive current threshold Idth being taken when the detection current value Ic of the photosensitive element obtained by multiplying the drive current value Id of the light-emitting element by a conversion rate CTR reaches a predetermined stop signal current threshold Icth. The control circuit preferably detects that the detection current value Ic of the photosensitive element reaches the stop signal current threshold Icth, and then, stops the operation of the switching power supply.

In the power supply system of the present invention, the stop signal is preferably output when the low-frequency transformer power supply is driven.

The power supply system of the present invention uses the photocoupler to transmit, to the control circuit on the primary side, the output voltage value on the secondary side of the transformer for the switching power supply. Moreover, when having received the stop signal for stopping the operation of the switching power supply, the power supply system of the present invention also uses the same photocoupler to transmit such a signal to the control circuit. Thus, the second switching element having received the stop signal supplies, to the photocoupler, the power output from the operating one of the low-frequency transformer power supply or the switching power supply, and even when any of the power supplies is stopped, operates the photocoupler to transmit the stop signal to the control circuit. Feedback transmission of the output voltage value and transmission of the stop signal to the switching power supply can be performed using the single photocoupler.

Moreover, in the power supply system of the present invention, the power supply switching element of which operation is controlled by the second switching element configured to receive the stop signal for the switching power supply supplies drive current from the output terminal side of the low-frequency transformer power supply and the switching power supply to the photocoupler via the drive resistor element. Thus, when the stop signal has been received, even if any of the power supplies is stopped, the photocoupler can operate to transmit the stop signal to the control circuit.

Further, in the power supply system of the present invention, the drive resistor element sets at such a resistance value that the current equal to or higher than the drive current threshold Idth of the light-emitting element can be supplied, the drive current threshold Idth being taken when the detection current value Ic of the photosensitive element reaches the predetermined stop signal current threshold Icth. Thus, the value of current flowing through the photosensitive element reaches equal to or higher than the Icth when the stop signal has been received. Such a state is detected, and therefore, the control circuit can stop the operation of the switching power supply.

In addition, in the power supply system of the present invention, the stop signal is output when the low-frequency transformer power supply is driven. Since power consumption of the switching power supply is less than power consumption of the low-frequency transformer power supply, power consumption of the system can be reduced when operation of the low-frequency transformer power supply is stopped in the power supply system.

DETAILED DESCRIPTION OF PREFERRED EMBODIMENTS

An embodiment of the present invention will be described below in detail with reference to drawings. The same reference numerals are used to represent equivalent elements in all of the drawings, and description thereof will not be repeatedly made.

Figure 1:
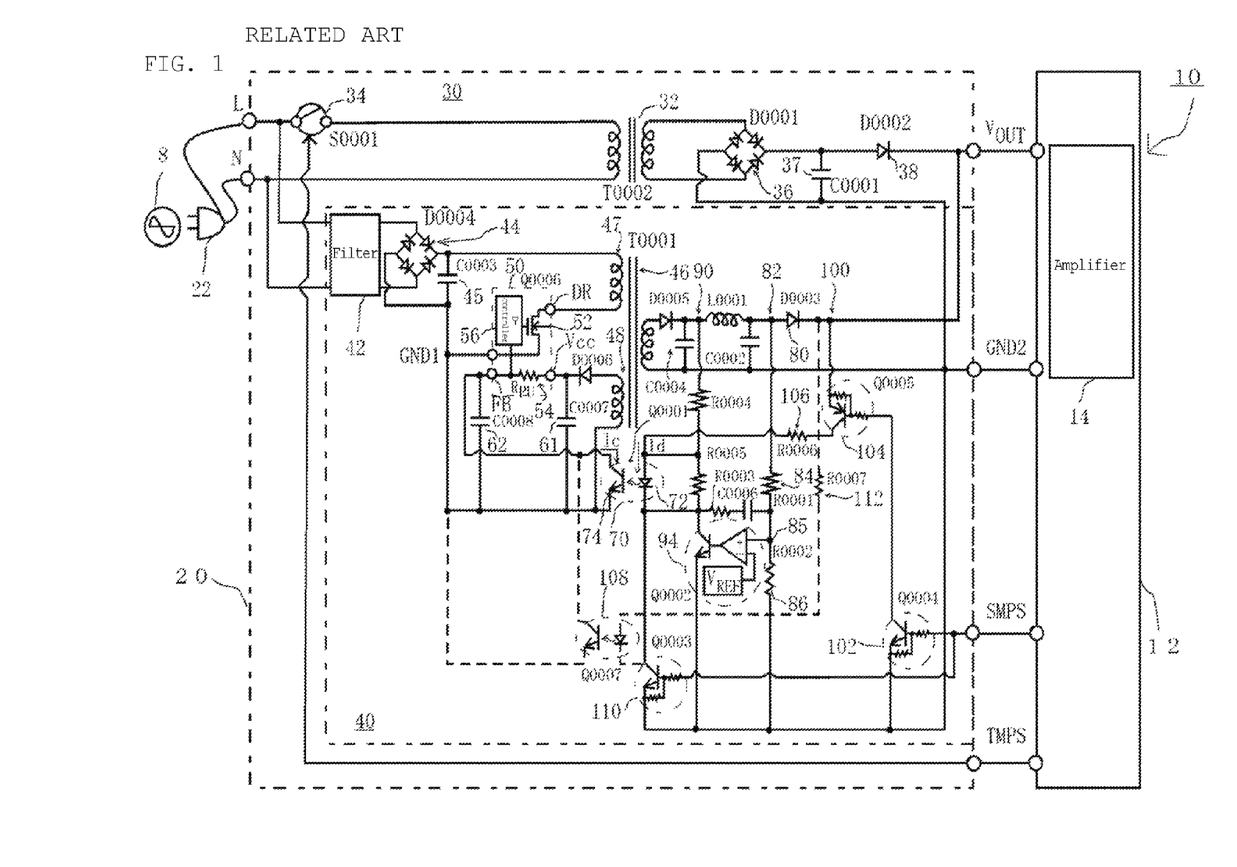
FIG. 1 is a configuration diagram of a power supply system of an embodiment of the present invention mounted on audio equipment.

FIG. 1 is a configuration diagram of audio equipment 10 including a power supply system 20. Note that a section indicated by dashed lines in FIG. 1 also indicates a configuration with the typical technique of using two photocouplers. Since the typical technique will be described later in detail with reference to FIG. 5, the section indicated by the dashed lines will not be described until description of the typical technique is made.

The audio equipment 10 includes an audio circuit section 12 and the power supply system 20. The audio circuit section 12 includes an amplifier 14. Power with less noise is preferably supplied to the amplifier 14 depending on amplifier output. On the other hand, power consumption of the audio circuit section 12 is preferably reduced in a standby state in which the amplifier 14 does not operate.

The power supply system 20 includes two power supplies, i.e., a low-frequency transformer power supply 30 of which power consumption is high, but is capable of supplying power with less noise depending on the output of the amplifier 14, and a switching power supply 40 which causes a certain degree of noise, but has low power consumption.

The power supply system 20 includes a terminal indicated as "TMPS" and configured to receive a signal for controlling ON/OFF of the low-frequency transformer power supply 30, and a terminal indicated as "SMPS" and configured to receive a signal for controlling ON/OFF of the switching power supply 40. When the TMPS is ON, the SMPS is OFF. When the SMPS is ON, the TMPS is OFF. Basically, the TMPS and the SMPS are not simultaneously turned ON, except for the period during state shift. When operation of the entirety of the power supply system 20 is stopped, both of the TMPS and the SMPS are OFF. The signal state of the TMPS and the signal state of the SMPS are controlled by the audio circuit section 12. In some cases, these states may be controlled by a control device other than the audio circuit section 12.

Of two output terminals indicated by "VOUT" and "GND2" in the power supply system 20, the VOUT is a terminal to which the output of the low-frequency transformer power supply 30 and the output of the switching power supply 40 are output in a parallelized state. The GND2 indicates a secondary ground, supposing that a later-described power input side is a primary side and a power output side is a secondary side. A primary ground is indicated as "GND1." Thus, when the low-frequency transformer power supply 30 operates, but the switching power supply 40 does not operate, the power of the low-frequency transformer power supply 30 is output between the VOUT and the GND2. When the switching power supply 40 operates, but the low-frequency transformer power supply 30 does not operate, the power of the switching power supply 40 is output between the VOUT and the GND2. Since the voltage value between the VOUT and the GND2 is an output voltage value, the output voltage value is hereinafter referred to as a "VOUT."

In the power supply system 20, two input terminals indicated by "L" and "N" are terminals connected to an external power supply connection 22 and configured to receive input power from an external power supply 8. The external power supply 8 is a commercial AC power supply, and the frequency thereof is a low frequency of 50 Hz or 60 Hz. The external power supply connection 22 is a power receptacle, for example. The GND1 is the primary ground when distinguished from the GND2 on the secondary side. In FIG. 1, a primary ground line and a secondary ground line are indicated by thick lines. The primary and secondary ground lines are electrically insulated from each other by a transformer (T0002) 32, a transformer (T0001) 46, and a photocoupler (Q0001) 70.

The low-frequency transformer power supply 30 uses the transformer (T0002) 32 for the low-frequency transformer power supply to increase/decrease the AC power of the primary-side external power supply 8 depending on the winding ratio between the primary and secondary sides of the transformer (T0002) 32, and then, outputs the power to the secondary side. The AC power output to the secondary side is rectified to DC power, and then, the DC power is output to the output terminals VOUT, GND2. The low-frequency transformer power supply 30 causes less noise because of performing no switching operation, and the transformer (T0002) 32 can transmit power depending on the power required for the audio circuit section 12. Thus, power can be supplied depending on the operation state of the amplifier 14.

A relay (S0001) 34 provided on the primary side of the transformer (T0002) 32 is turned ON/OFF according to a IMPS signal. When the relay (S0001) 34 is ON, the low-frequency transformer power supply 30 operates. When the relay (S0001) 34 is OFF, operation of the low-frequency transformer power supply 30 is stopped.

A diode bridge (D0001) 36 and a capacitor (C0001) 37 provided on the secondary side of the transformer (T0002) 32 form a rectification smoothing circuit configured to convert, into DC power, the AC power output to the secondary side of the transformer (T0002) 32. An output diode (D0002) 38 is a rectifier element configured to prevent power backflow from the output terminal VOUT.

The switching power supply 40 uses a first switching element 52 of a control circuit (Q0006) 50 to convert the DC power obtained by rectification and smoothing of the AC power of the external power supply 8 into a rectangular-wave signal, and uses the transformer (T0001) 46 for the switching power supply to output the rectangular-wave signal to the secondary side. Then, the rectangular-wave signal output to the secondary side is rectified and smoothed to output the rectified and smoothed signal to the output terminals VOUT, GND2 (First Function). In addition, the switching power supply 40 detects an output voltage value, i.e., the voltage value of the rectified and smoothed DC power on the secondary side, and uses the photocoupler (Q0001) 70 to feed back the detected output voltage value to the control circuit (Q0006) 50 (Second Function). Moreover, when having received an SMPS signal as a stop signal for the switching power supply, the switching power supply 40 uses the same photocoupler (Q0001) 70 to transmit such a signal to the control circuit (Q0006) 50 (Third Function).

Regarding the configuration of the switching power supply 40, the primary side of the transformer (T0001) 46 for the switching power supply will be first described, followed by description of the secondary side.

On the primary side of the transformer (T0001) 46, a filter 42 is a filter circuit configured to prevent the noise caused due to switching of the switching power supply 40 from passing through the external power supply 8. A diode bridge (D0004) 44 and a capacitor (C0003) 45 form a rectification smoothing circuit configured to convert the AC power having passed through the filter 42 into DC power.

On the primary side of the transformer (T0001) 46, a first coil 47 and a second coil 48 are provided. One end of the first coil 47 is connected to the output side of the rectification smoothing circuit, and the other end of the first coil 47 is connected to a drain terminal of the first switching element 52 of the control circuit (Q0006) 50. The first coil 47 is configured to supply, to the secondary side, the rectangular-wave power generated by the operation of the first switching element 52. The second coil 48 is magnetically coupled to the first coil 47, and is configured to generate the DC power having a predetermined voltage value VCC from the output power of the rectification smoothing circuit. One end of the second coil 48 is connected to a VCC terminal of the control circuit (Q0006) 50 via a rectification smoothing circuit formed of a diode (D0006) 60 and a capacitor (C0007) 61, and the other end of the second coil 48 is connected to the GND1.

The control circuit (Q0006) 50 controls the overall operation of the switching power supply 40 including the first to third functions of the switching power supply 40. The control circuit (Q0006) 50 is formed of a single IC chip. In FIG. 1, the sections relating to the first to third ones of the functions of the control circuit (Q0006) 50 are extracted and illustrated. In addition to the VCC terminal and the GND1 terminal, the control circuit (Q0006) 50 further includes a feedback (FB) terminal as an input terminal, and a drain (DR) terminal as an output terminal.

The first switching element 52 is an N-channel MOSFET. A drain of the first switching element 52 is connected to the other end of the first coil 47 via the drain (DR) terminal of the control circuit (Q0006) 50, a source of the first switching element 52 is connected to the GND1, and a gate of the first switching element 52 is connected to a D-controller 56.

The feedback (FB) terminal of the control circuit (Q0006) 50 is connected to a collector terminal of a photosensitive element 74 of the photocoupler (Q0001) 70. A capacitor (C0008) 62 provided between the feedback (FB) terminal and the GND1 is a smoothing capacitor configured to reduce voltage change etc.

A feedback resistor (RPU) 54 provided between the VCC terminal and the feedback (FB) terminal is a resistor element configured to convert, into a voltage value, the magnitude of a detection current value Ic flowing through the photosensitive element 74.

The D-controller 56 includes a not-shown clock generation circuit. The D-controller 56 has the function of setting a duty D for ON and OFF periods of a single cycle of a clock depending on the voltage value converted by the feedback resistor (RPU) 54, where the duty D={ON Period/(ON Period+OFF Period)}. Further, the D-controller 56 has the function of controlling ON/OFF of the first switching element 52 at the set duty D. Moreover, the D-controller 56 has the function of stopping the entire operation, including the operation of the first switching element 52, of the switching power supply 40 when the voltage value converted by the feedback resistor (RPU) 54 reaches equal to or less than a preset stop signal voltage threshold. These functions will be described below in detail with reference to FIG. 2.

Next, the secondary side of the transformer (T0001) 46 will be described. The transformer (T0001) 46 increases/decreases the rectangular-wave power supplied to the primary-side first coil 47 depending on the winding ratio between the primary and secondary sides of transformer (T0001) 46, and then, outputs the power to the secondary side. This is the first function of the switching power supply 40. A diode (D0005) and a capacitor (C0004) on the secondary side are elements used for flyback buck-boost, and an inductor (L0001) and a capacitor (C0002) provided at a later stage form a filter circuit. Since the configurations of these components are well-known, these configurations will not be described in detail. An output diode (D0003) 80 is a rectifier element configured to prevent power backflow from the output terminal VOUT. Two terminals VOUT, GND2 are shared between the secondary side of the switching power supply 40 and the secondary side of the low-frequency transformer power supply 30, and serve as two terminals VOUT, GND2 of the power supply system 20.

A connection point 82 between the output diode (D0003) 80 on the secondary side and the inductor (L0001) at a former stage is a monitoring point of the output voltage value VOUT. A resistor element (R0001) 84 and a resistor element (R0002) 86 are connected in series between the connection point 82 and the GND2, and a connection point 85 between the resistor element (R0001) 84 and the resistor element (R0002) 86 is an actual output voltage value detection point. The voltage value at the connection point 85 is obtained by Output Voltage Value VOUT×[Resistance Value of Resistor Element (R0002) 86/{Resistance Value of Resistor Element (R0001) 84+Resistance Value of Resistor Element (R0002) 86}].

A connection point 90 among the diode (D0005) and the capacitor (C0004) used for the flyback buck-boost and the inductor (L0001) and the capacitor (C0002) used as the filter circuit is a drive power supply point where drive power is supplied to a light-emitting element 72 of the photocoupler (Q0001) 70. A resistor element (R0004) 92, the light-emitting element 72, and a shunt regulator (Q0002) 94 are connected in series between the connection point 90 and the GND2. Note that a resistor element (R0005), a resistor element (R0003), and a capacitor (C0006) provided at the periphery of the above-described components are for, e.g., circuit operation stabilization, and will not be described in detail.

The shunt regulator (Q0002) 94 includes a differential amplifier and a drive transistor. The voltage value at the connection point 85 as the output voltage value detection point is input to a positive-side input terminal of the differential amplifier, and a reference voltage value (VREF) is input to a negative-side input terminal of the differential amplifier. A base of the drive transistor is connected to an output terminal of the differential amplifier, a collector of the drive transistor is connected to a cathode of the light-emitting element 72, and an emitter of the drive transistor is connected to the GND2.

The features of the shunt regulator (Q0002) 94 are as follows. When the voltage value at the connection point 85 as the output voltage value detection point is less than the reference voltage value (VREF), the collector current of the drive transistor decreases depending on the magnitude of deviation. Conversely, when the voltage value at the connection point 85 as the output voltage value detection point is greater than the reference voltage value (VREF), the collector current of the drive transistor increases depending on the magnitude of deviation. As described above, the shunt regulator (Q0002) 94 functions as an output voltage detection circuit for detecting the output voltage value VOUT.

With an increase/decrease in the collector current of the drive transistor, the current value Id of the light-emitting element 72 increases/decreases in the photocoupler (Q0001) 70, and the detection current value Ic of the photosensitive element 74 increases/decreases in the photocoupler (Q0001) 70. An increase/decrease in the detection current value Ic of the photosensitive element 74 changes the voltage value of the feedback (FB) terminal, and accordingly, changes the duty of the D-controller 56. As a result, the output current value of the first switching element 52 increases/decreases. In this manner, a change in the output voltage value VOUT is fed back to the control circuit (Q0006) 50 by the photocoupler (Q0001) 70. This is the second function of the switching power supply 40.

When the output voltage value VOUT increases to exceed a predetermined value, the voltage value at the connection point 85 increases, and accordingly, the output current value of the drive transistor of the shunt regulator (Q0002) 94 increases. This increases the current value Id of the light-emitting element 72, as well as increasing the detection current value Ic of the photosensitive element 74. Thus, the voltage value VFB of the feedback (FB) terminal decreases, and accordingly, the duty D of the D-controller 56 decreases. The first switching element 52 decreases the value of current flowing through the primary side of the transformer (T0001) 46, as well as decreasing the value of current flowing through the secondary side of the transformer (T0001) 46. Consequently, the output voltage value VOUT decreases.

When the output voltage value VOUT decreases to fall below the predetermined value, the voltage value at the connection point 85 decreases, and accordingly, the output current value of the drive transistor of the shunt regulator (Q0002) 94 decreases. This decreases the current value Id of the light-emitting element 72, as well as decreasing the detection current value Ic of the photosensitive element 74. Thus, the voltage value VFB of the feedback (FB) terminal increases, and accordingly, the duty D of the D-controller 56 increases. The first switching element 52 increases the value of current flowing through the primary side of the transformer (T0001) 46, as well as increasing the value of current flowing through the secondary side of the transformer (T0001) 46. Consequently, the output voltage value VOUT increases.

Returning back to FIG. 1, the configuration for receiving the SMPS signal as the stop signal for stopping operation of the switching power supply 40 will be described. An output point 100 of the output diode (D0003) 80 on the secondary side serves not only as the output terminal of the low-frequency transformer power supply 30 but also as the output terminal of the switching power supply 40. That is, the output point 100 serves as the output terminal of an operating one of the low-frequency transformer power supply 30 or the switching power supply 40. When the SMPS signal as the stop signal has been received using the output point 100, drive power is supplied to the photocoupler (Q0001) 70. A photocoupler drive circuit configured to supply drive power to the photocoupler (Q0001) 70 includes a second switching element (Q0004) 102, a power supply switching element (Q0005) 104, a drive resistor element (R0006) 106, and a ground switching element (Q0003) 110.

In FIG. 1, the second switching element (Q0004) 102 is a digital transistor configured to receive the SMPS signal as the stop signal. The digital transistor is an integrated element of a bipolar transistor and a resistor element. In an example of the second switching element (Q0004) 102, a resistor element is provided between a base and an emitter of an NPN transistor, and another resistor element is provided between the base of the NPN transistor and a base terminal of a digital transistor.

The base terminal of the second switching element (Q0004) 102 is connected to the SMPS terminal, an emitter terminal of the second switching element (Q0004) 102 is connected to the GND2, and a collector terminal of the second switching element (Q0004) 102 is connected to a base terminal of the power supply switching element (Q0005) 104.

The power supply switching element (Q0005) 104 is a digital transistor configured to supply drive power to the light-emitting element 72 of the photocoupler (Q0001) 70 via the drive resistor element (R0006) 106. A bipolar transistor forming the power supply switching element (Q0005) 104 is a PNP transistor.

A collector terminal of the power supply switching element (Q0005) 104 is connected to the output point 100, a base terminal of the power supply switching element (Q0005) 104 is connected to the collector terminal of the second switching element (Q0004) 102, and an emitter terminal of the power supply switching element (Q0005) 104 is connected to an anode of the light-emitting element 72 of the photocoupler (Q0001) 70 via the drive resistor element (R0006) 106.

The ground switching element (Q0003) 110 provided between the cathode of the light-emitting element 72 of the photocoupler (Q0001) 70 and the GND2 is a digital transistor configured to connect the cathode of the light-emitting element 72 to the GND 2 upon reception of the SMPS signal as the stop signal to cause the drive power supplied to the anode to flow through the GND2. A bipolar transistor forming the ground switching element (Q0003) 110 is an NPN transistor.

A collector terminal of the ground switching element (Q0003) 110 is connected to the cathode of the light-emitting element 72, a base terminal of the ground switching element (Q0003) 110 is directly connected to the SMPS terminal, and an emitter terminal of the ground switching element (Q0003) 110 is connected to the GND2.

Operation of each of the above-described elements upon reception of the SMPS signal as the stop signal is as follows. When the TMPS signal is ON, the SMPS signal is at an "L" level. At this point, the switching power supply 40 operates with the SMPS signal being OFF. When the SMPS signal shifts to an "H" level, the operation of the switching power supply 40 is stopped with the SMPS signal being ON. Thus, the SMPS signal at the "H" level is the stop signal for the switching power supply 40.

When the SMPS signal is at the "L" level, the second switching element (Q0004) 102 is OFF, the power supply switching element (Q0005) 104 is OFF, and the ground switching element (Q0003) 110 is OFF. Thus, from the side of the photocoupler (Q0001) 70, any of the second switching element (Q0004) 102, the power supply switching element (Q0005) 104, or the ground switching element (Q0003) 110 are considered as absent, and the feedback operation of the output voltage value VOUT described above is performed as it is.

When the SMPS signal is at the "H" level, the second switching element (Q0004) 102 is turned ON, and accordingly, the power supply switching element (Q0005) 104 is also turned ON. Moreover, the ground switching element (Q0003) 110 is also turned ON. Thus, the power supply switching element (Q0005) 104 in the ON state, the drive resistor element (R0006) 106, the light-emitting element 72 of the photocoupler (Q0001) 70, and the ground switching element (Q0003) 110 in the ON state are connected in series between the output point 100 and the GND2. Thus, drive power is supplied from the output point 100 to the GND2 without current drawing by the drive transistor of the shunt regulator (Q0002) 94, and therefore, the light-emitting element 72 emits light. With such light emission, the detection current Ic flows through the photosensitive element 74 of the photocoupler (Q0001) 70, and the SMPS signal as the stop signal is transmitted to the control circuit (Q0006) 50 via the feedback (FB) terminal.

At this point, the resistance value of the drive resistor element (R0006) 106 is set as follows in the control circuit (Q0006) 50 such that the control for stopping the operation of the switching power supply 40 is made. When the voltage value VFB of the feedback (FB) terminal decreases, the D-controller 56 decreases the duty D. The control circuit (Q0006) 50 has the function of stopping switching operation when the VFB falls below a certain voltage value. Such a certain voltage value is taken as a stop signal voltage threshold, and the detection current value Ic of the photosensitive element 74 corresponding to the stop signal voltage threshold is taken as a stop signal current threshold Icth.

Since the detection current value Ic of the photosensitive element 74 is obtained by multiplying the drive current value Id of the light-emitting element 72 by a conversion rate CTR, the current equal to or higher than the drive current threshold Idth of the light-emitting element 72 when the detection current value of the photosensitive element 74 reaches the stop signal current threshold Icth may be supplied to the light-emitting element 72. Thus, the resistance value of the drive resistor element (R0006) 106 is set so that the current equal to or higher than the drive current threshold Idth can be supplied to the light-emitting element 72.

With this configuration, when the photocoupler (Q0001) 70 used for feedback of the output voltage value VOUT has received the SMPS signal as the stop signal, such a stop signal can be transmitted to the control circuit (Q0006) 50. This is the third function of the switching power supply 40.

Figure 2:
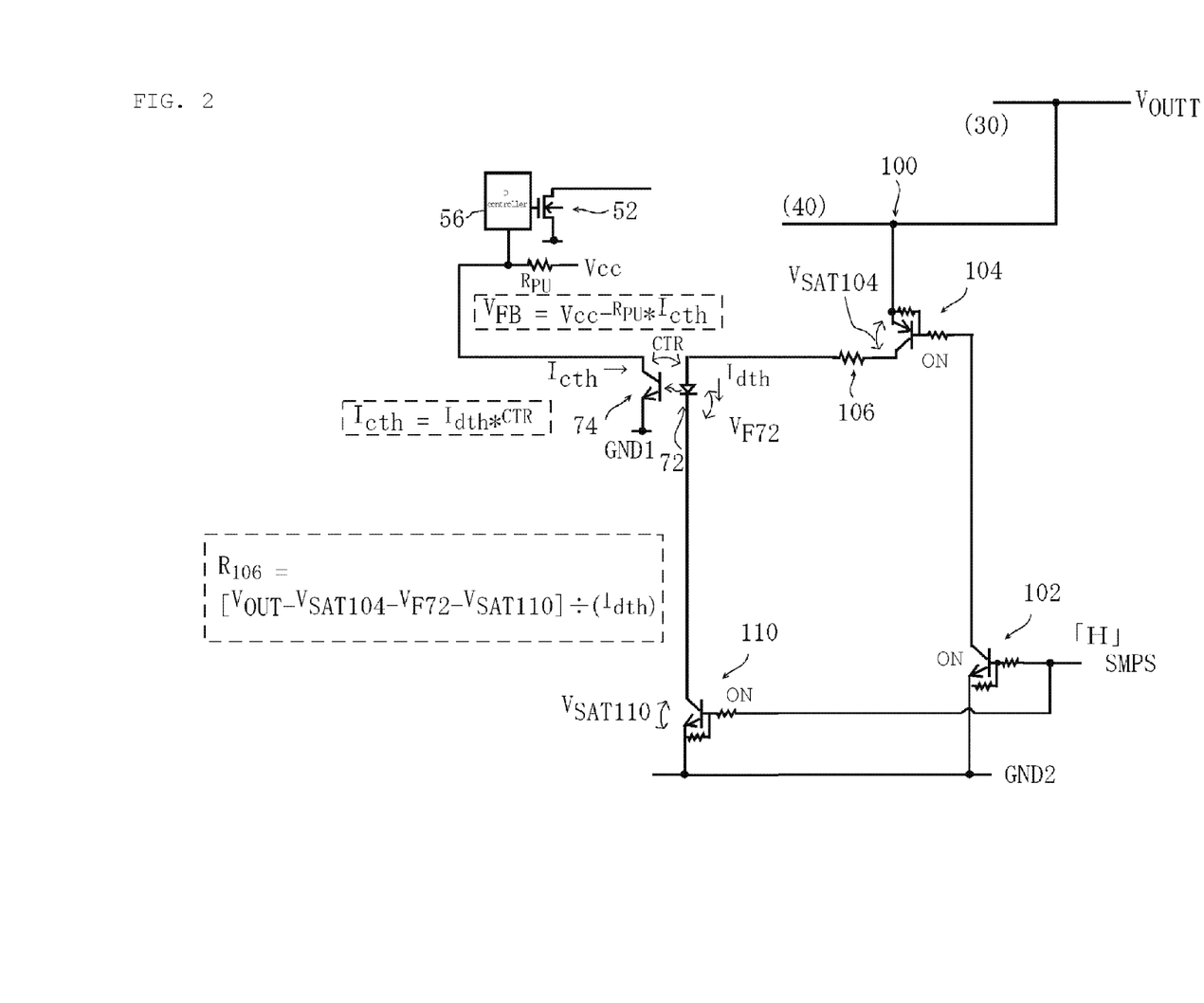
FIG. 2 is a diagram of a signal flow in the power supply system of the embodiment of the present invention when a stop signal for a switching power supply has received.

FIG. 2 is a diagram illustrating, as the third function of the switching power supply 40, the function of using the photocoupler (Q0001) 70 to transmit the SMPS signal as the stop signal. When the SMPS signal is at the "H" level, the second switching element (Q0004) 102 is ON, the power supply switching element (Q0005) 104 is ON, and the ground switching element (Q0003) 110 is ON. Thus, drive current flows from the output point 100 toward the GND2 through the power supply switching element (Q0005) 104, the drive resistor element (R0006) 106, the light-emitting element 72 of the photocoupler (Q0001) 70, and the ground switching element (Q0003) 110.

The voltage value VFB of the feedback (FB) terminal when the switching power supply 40 is stopped by the D-controller 56 is represented by VFB=(VCC−RPU×Icth). The Icth is the stop signal current threshold. The Icth is represented by Icth=(Idth×CTR), where CTR is the conversion rate between the drive current value Id of the light-emitting element 72 and the detection current value Ic of the photosensitive element 74. The Idth is the drive current threshold.

Supposing that a saturated voltage value when the power supply switching element (Q0005) 104 is ON is VSAT104, a saturated voltage value when the ground switching element (Q0003) 110 is ON is VSAT110, and the forward voltage value of the light-emitting element 72 is VF70, the resistance value R106 of the drive resistor element (R0006) 106 is obtained as follows: R106={(VOUT−VSAT104−VF70−VSAT110)/Idth}.

The photocoupler (Q0001) 70 used for the feedback of the output voltage value VOUT can be also used for transmission of the SMPS signal as the stop signal in such a manner that the resistance value R106 of the drive resistor element (R0006) 106 is set at the above-described value or less.

Figure 3:
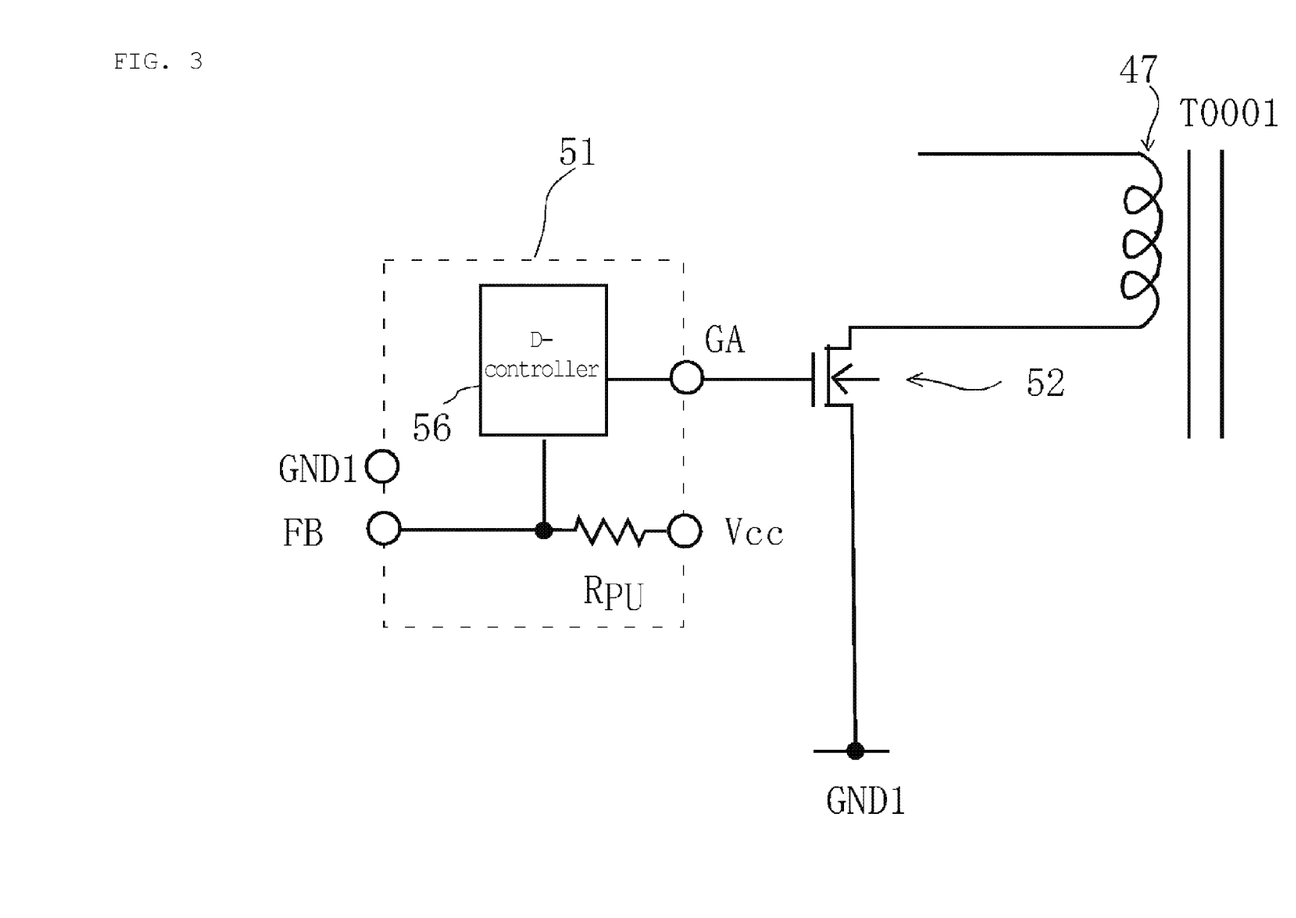
FIG. 3 is a diagram of another embodiment of a control circuit.

As described above, the control circuit (Q0006) 50 includes the first switching element 52. FIG. 3 is a diagram illustrating an example of a control circuit 51 including no first switching element 52. In this case, a gate terminal (GA) connected to a gate of an external first switching element 52 is provided corresponding to the drain terminal (DR) of the control circuit (Q0006) 50.

Figure 4:
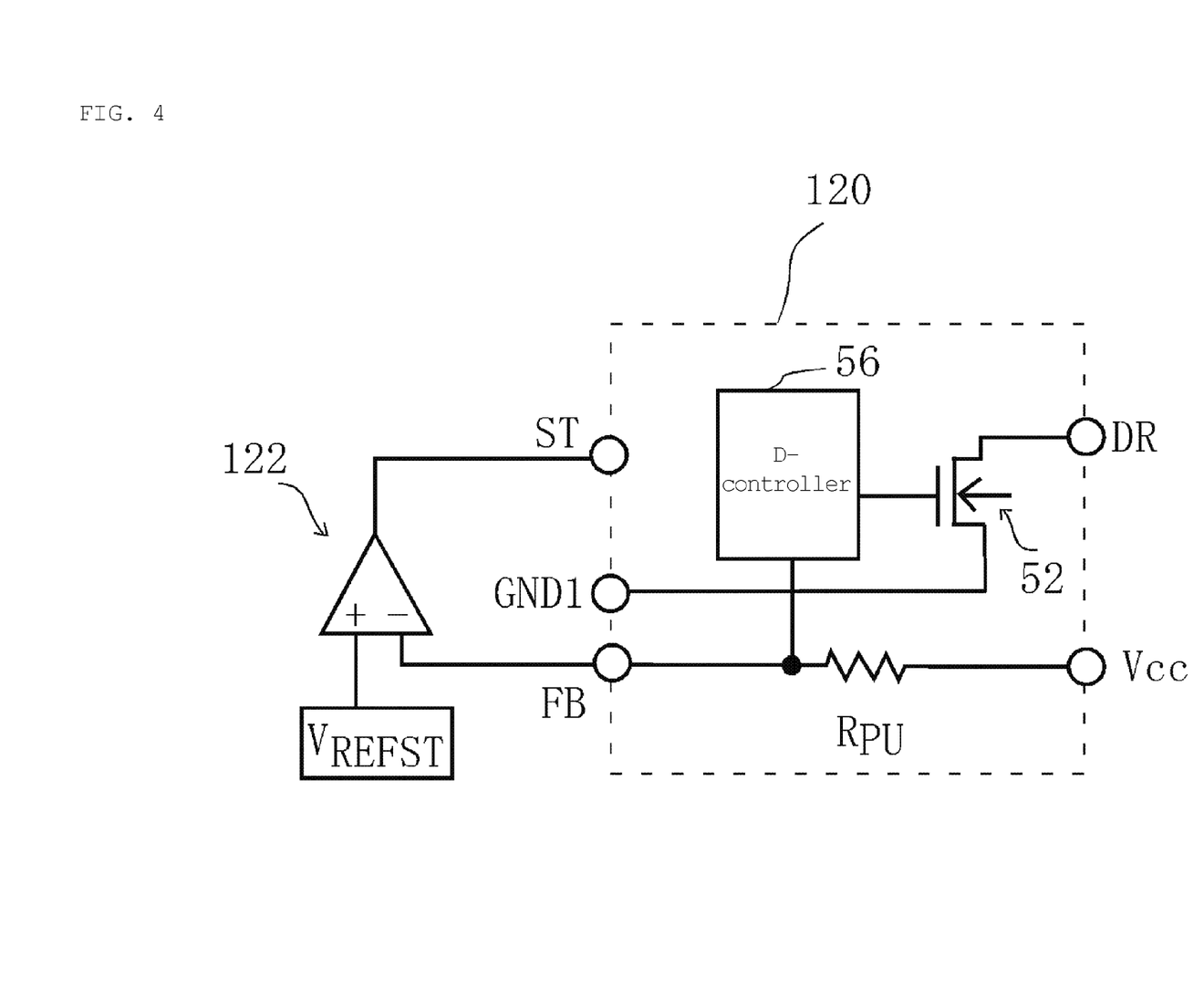
FIG. 4 is a diagram of still another embodiment of the control circuit.

As described above, when the voltage value VFB of the feedback (FB) terminal reaches equal to or less than the stop signal voltage threshold, the operation of the switching power supply 40 is stopped by the function of the D-controller 56. Instead, the voltage value VFB of the feedback (FB) terminal may be compared with a preset reference voltage (VREFST), and a stop signal (ST) may be output to the control circuit. FIG. 4 is a diagram illustrating an example where the reference voltage value (VREFST) is input to a positive-side input terminal of a differential amplifier 122, the voltage value (VFB) of the feedback (FB) terminal is input to a negative-side input terminal of the differential amplifier 122, and an output (ST) is input to a control circuit 120.

Figure 5:
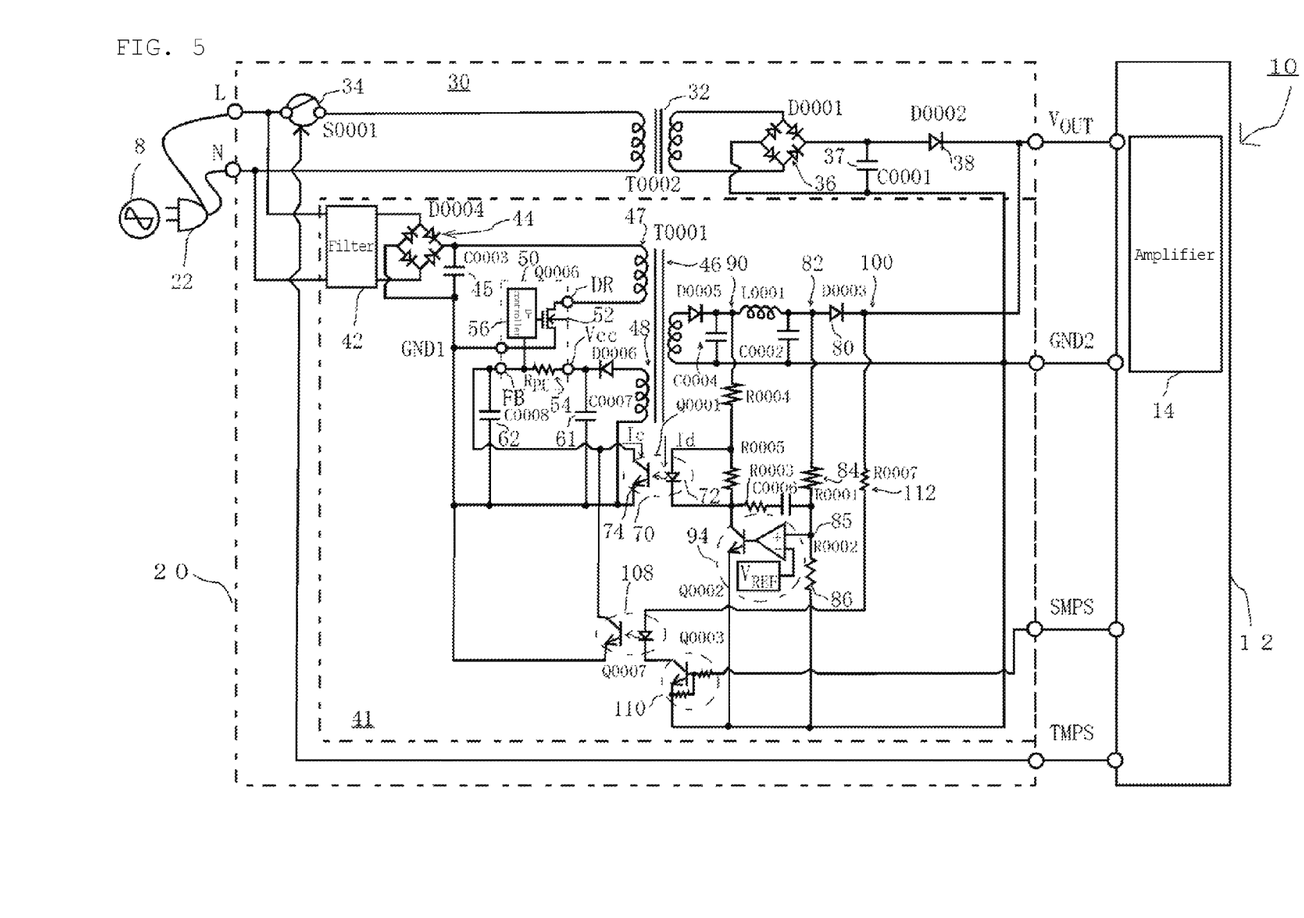
FIG. 5 is a configuration diagram of a switching power supply with the typical technique of using two photocouplers.

FIG. 5 is a configuration diagram of a switching power supply 41 with the typical technique of using two photocouplers. A section indicated by solid lines in FIG. 5 corresponds to the section indicated by the dashed lines in FIG. 1. In the switching power supply 41, a second photocoupler 108 is used to transmit a SMPS signal as a stop signal. The drive power of a light-emitting element 72 of the second photocoupler 108 is supplied from the output point 100 to an anode of the light-emitting element 72 via a drive resistor element 112. A cathode of the light-emitting element 72 is connected to the GND2 via the ground switching element (Q0003) 110.

In comparison between the switching power supplies 40, 41 with reference to both of the solid lines of FIG. 5 and the dashed lines of FIG. 1, the switching power supply 40 uses only a single expensive photocoupler with a great volume, and therefore, a more-compact power supply system 20 can be formed at lower cost as compared to the switching power supply 41 with the typical technique.

What is claimed is:

1. A power supply system comprising:
a low-frequency transformer power supply; and
a switching power supply,
wherein the switching power supply includes
   a first switching element connected between a primary winding of a transformer for the switching power supply and a ground,
   a rectification smoothing circuit connected to a secondary winding side of the transformer for the switching power supply,
   an output voltage detection circuit configured to detect an output voltage value of the rectification smoothing circuit,
   a photocoupler configured to transmit the output voltage value to a control circuit for output voltage feedback control, and
   a photocoupler drive circuit including a second switching element configured to receive a stop signal for stopping operation of the switching power supply, and configured such that when the second switching element has received the stop signal, power output from an operating one of the low-frequency transformer power supply or the switching power supply is supplied to the photocoupler, and the receipt of the stop signal for the switching power supply is transmitted to the control circuit via the photocoupler, and
the photocoupler drive circuit includes
   a power supply switching element of which emitter terminal is connected to output terminals of the low-frequency transformer power supply and the switching power supply, of which collector terminal is connected to an anode of the light-emitting element via a drive resistor element, and of which base terminal is connected to an output terminal of the second switching element, and
   a ground switching element configured to ground a cathode of the light-emitting element when the stop signal has been received.

2. The power supply system according to claim 1, wherein the photocoupler includes a light-emitting element provided on the output voltage detection circuit side, and a photosensitive element provided on the control circuit side.

3. The power supply system according to claim 2, wherein the drive resistor element is set at such a resistance value that a current equal to or higher than a drive current threshold Idth of the light-emitting element can be supplied, the drive current threshold Idth being taken when a detection current value Ic of the photosensitive element obtained by multiplying a drive current value Id of the light-emitting element by a conversion rate CTR reaches a predetermined stop signal current threshold Icth, and
the control circuit detects that the detection current value Ic of the photosensitive element reaches the stop signal current threshold Icth, and then, stops the operation of the switching power supply.

4. The power supply system according to claim 1, wherein the stop signal is output when the low-frequency transformer power supply is driven.

* * * * *